United States Patent [19]
Paulsson et al.

[11] Patent Number: 5,583,883
[45] Date of Patent: Dec. 10, 1996

[54] ELECTRIC ARC-FURNACE STABILIZATION USING VOLTAGE PULSE INJECTION

[75] Inventors: Lars Paulsson, Vittsjö; Lennart Ängquist, Enköping, both of Sweden

[73] Assignee: Asea Brown Boveri AB, Vasteras, Sweden

[21] Appl. No.: 325,308

[22] PCT Filed: Jan. 31, 1994

[86] PCT No.: PCT/SE94/00072
   § 371 Date: Oct. 24, 1994
   § 102(e) Date: Oct. 24, 1994

[87] PCT Pub. No.: WO94/22279
   PCT Pub. Date: Sep. 29, 1994

[30] Foreign Application Priority Data

Mar. 18, 1993 [SE] Sweden ................... 9300897

[51] Int. Cl.$^6$ ................................. H05B 7/144
[52] U.S. Cl. .................. 373/102; 373/104; 373/108
[58] Field of Search ....................... 373/101–108

[56] References Cited

U.S. PATENT DOCUMENTS

| | | | |
|---|---|---|---|
| 4,320,245 | 3/1982 | Gaydon et al. | 373/104 |
| 4,663,764 | 5/1987 | Bretthauer et al. | 373/104 |
| 4,677,643 | 6/1987 | Dicks | 373/105 |
| 4,797,897 | 1/1989 | Stenzel et al. | 373/105 |
| 5,155,740 | 10/1992 | Ao et al. | 373/108 |
| 5,438,588 | 8/1995 | Wanner | 373/108 |

*Primary Examiner*—Tu B. Hoang
*Attorney, Agent, or Firm*—Watson Cole Stevens David, PLLC

[57] ABSTRACT

An arc furnace (1) has an electrode (13) and connection members (14) for connection to a power-supply network (20) for supplying an arc (16) at the electrode with current. The furnace is provided with a voltage-pulse generating member (3) adapted, in connection with an interruption in the arc, to supply voltage pulses to the furnace for striking the arc.

12 Claims, 4 Drawing Sheets

5,583,883

ELECTRIC ARC-FURNACE STABILIZATION USING VOLTAGE PULSE INJECTION

TECHNICAL FIELD

The present invention relates to furnace equipment, comprising an arc furnace having at least one electrode and connection members for connecting the furnace to a power-supply network for supplying an arc at the electrode with current.

BACKGROUND ART

Electric arc furnaces have long been used, for example for steel manufacture. Such a furnace has one or more electrodes and a furnace container, in which the charge of the furnace is applied. The electrode or electrodes is or are connected to an electric power network, which feeds current to one or more arcs which are burning between the electrodes and the charge and/or between the electrodes. The electrical energy developed in the arcs results in the desired heating of the furnace charge.

Arc furnaces are usually supplied with alternating voltage, but also arc furnaces supplied with direct voltage occur. A typical arc furnace for use during steel manufacture has three electrodes arranged above the charge, which are each connected to their own phase in a three-phase power-supply network. The electrodes can be provided in a known manner with devices for position control of the electrodes, that is, for control of their distances to the charge and hence of the length of the arcs. The furnace is usually connected to the network via a furnace transformer, which is normally provided with an on-load tap changer for control of the voltage supplied to the furnace.

Arc furnaces are often designed for very high power, and the effect of such a furnace on the power-supply network, as well as its effect on other consumers connected to this network, may therefore be strong.

An arc furnace exhibits, especially during certain types of operation such as, for example, during melting of a charge, unstable operating conditions. Short circuits between the electrodes and the charge frequently occur, with surge currents resulting therefrom. Also, it may occur that an arc is extinguished, whereby the current in the phase in question ceases altogether. Usually, these disturbances are unsymmetrical in such a way that two phases become short-circuited and one phase currentless. These phenomena give rise to considerable load variations in the power-supply network, and the load variations cause voltage variations in the network.

Low-frequency components of the above voltage variations can be reduced with the aid of equipment for controllable static reactive-power compensation. However, a considerable part of the voltage variations caused by an arc furnace lie within a frequency range—about 4–8 Hz—where the voltage variations cause so-called flicker, which is disturbing to the eye, that is, variations in light intensity of light bulbs and other light sources, as well as other disturbances, for example changes in the appearance of the picture in TV receivers, while at the same time the frequency of the disturbances is so high that it is not possible to reduce the disturbances to the desirable extent with the aid of controllable reactive-power compensation.

Unless the short-circuit power of the electric power-supply network is very large in relation to the rated power of the furnace, an arc furnace will, for the above reasons, cause inconvenient disturbances for the other subscribers.

After the meltdown phase, the arcs of the furnace burn in a more stable manner, which reduces the above-mentioned disturbances. During this phase, an arc is extinguished at each zero crossing of the electrode current and is regularly restruck after a certain time during the next half-cycle of the electrode voltage, when the voltage with the new polarity has reached a certain value sufficient for firing. A currentless interval appears between each extinction and the following firing, that is, once every half-cycle. These currentless intervals reduce the average power developed in the arcs and hence the production capacity of the furnace. It is therefore desirable to reduce the length of the currentless intervals, if possible.

It is previously known that, by connecting additional inductances into the supply lines of the electrodes, faster restrikings after the zero crossings of the current can be obtained. This results in a reduction of the length of the currentless intervals. However, for the furnace equipment as a whole, the method entails a lower power factor and a lower current amplitude but, on the other hand, it results in longer arcing times and hence a possibility of increased furnace production. At the same time, the costs of the furnace equipment, and the losses therein, increase.

SUMMARY OF THE INVENTION

The invention aims to provide equipment of the kind described in the introductory part of the specification, in which, without increasing the losses of the equipment or the reactivepower consumption, a reduction of the disturbances (e.g. flicker), caused by the furnace, on the power-supply network as well as a reduction of the length of the currentless intervals of the arcs can be achieved and hence a high production capacity of the furnace be attained.

What characterizes equipment according to the invention in more detail will become clear from the appended claims.

According to one embodiment of the invention, the voltage pulse is generated by establishing a short-circuit path in parallel with the furnace, whereupon the short-circuit path is broken. A voltage pulse can in this way, that is, by breaking up an inductive circuit, be generated in a simple manner and with a minimum of necessary additional equipment. The short-circuit path is preferably arranged by firing a thyristor, preferably a gate turn-off thyristor (GTO), which is included in a thyristor circuit capable of being turned off and arranged in parallel with the furnace, and the short-circuit path is broken by turning off the mentioned thyristor.

It has proved that an increase of the advantages provided by the invention can be obtained by generating the voltage pulse for firing with a certain delay in relation to the interruption of the arc. In many cases, it has proved that the magnitude of this delay can influence the magnitude and the frequency spectrum of the disturbances generated by the furnace as well as the amplitude of the furnace current and the length of the currentless intervals. According to one embodiment of the invention, therefore, the delay is controlled in dependence on some suitable sensed quantity, or function of sensed quantities, in such a way that an optimum relation is obtained between the quantities influenced by the delay.

BRIEF DESCRIPTION OF THE DRAWINGS

In the following the invention will be described with reference to the accompanying FIGS. 1–7.

DESCRIPTION OF THE PREFERRED EMBODIMENTS

Figure 1:
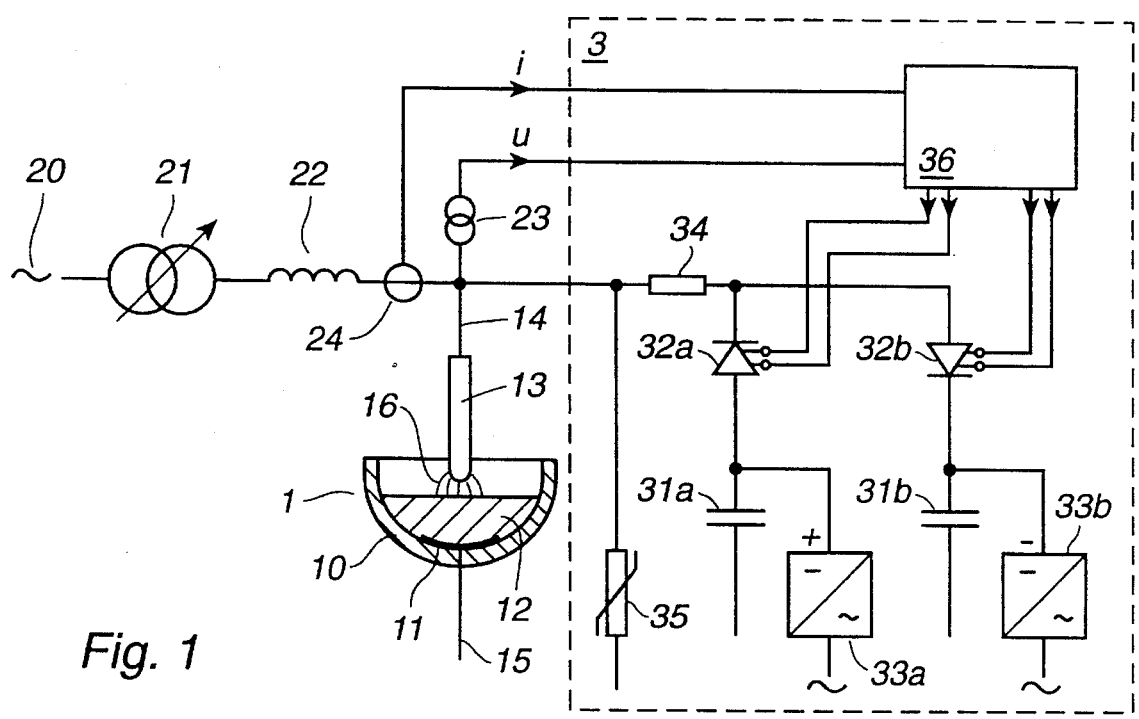
FIG. 1 shows an example of equipment according to the invention.

FIG. 1 shows in the form of a single-line diagram furnace equipment according to one embodiment of the invention. It comprises a schematically shown arc furnace 1 which has a furnace container 10 with a bottom contact 11, which makes electrical contact with a charge 12 located in the furnace container. A furnace electrode 13 is arranged above the charge. The electrode has a connection lead 14 and the bottom contact a connection lead 15. During operation of the furnace, an arc 16 is burning between the electrode and the charge.

The furnace is supplied from a power network 20 via a furnace transformer 21 provided with an on-load tap changer. The secondary winding of the transformer is connected, via an inductance 22, to the connection lead 14 of the furnace. In parallel with the furnace, a pulse generator 3 is connected and adapted to apply voltage pulses across the furnace in a way which will be described below.

A voltage-measuring member 23, for example a voltage transformer, is connected to the furnace and delivers to the pulse generator a signal "u" corresponding to the instantaneous value of the furnace voltage. A current-measuring device 24, for example a current transformer, is connected in the supply lead to the furnace and is adapted to supply a signal "i" which corresponds to the instantaneous value of the current supplied from the transformer to the furnace. The signals "u" and "i" are used in a manner which will be described below for controlling the pulse generator 3 such that current pulses with a suitable polarity and a suitable phase position are applied to the furnace.

The furnace may be a single-phase furnace and be supplied from a single-phase power network, and the equipment then closely corresponds to that shown in FIG. 1. Alternatively, the furnace may be a three-phase furnace and be supplied from a three-phase power network via a three-phase furnace transformer. In this case, the furnace may have no bottom contact, and the pulse-generating member 3 may then be connected to the connection leads of the three electrodes and apply voltage pulses to the furnace with a suitable polarity and a suitable phase position between the electrodes instead of, as shown in FIG. 1, between the electrode and a bottom contact.

In a known manner, the inductance 22 can consist of a discrete inductor connected between the furnace transformer and the furnace. Since a considerable advantage which is obtained with the invention is that stable operation can be achieved with a lower series inductance than what has been possible earlier, a discrete inductor may possibly be completely avoided, and the inductance 22 in FIG. 1 then consists of the inductances of the network, the furnace transformer and the connection lead 14.

The furnace 1 is only schematically shown and may be provided with additional suitable or necessary items of equipment or features, known per se, such as control devices for position control of the electrodes and of the on-load tap changer of the transformer.

The pulse generator 3 is connected to the electrode connection 14 of the furnace. It can supply voltage pulses of both polarities, and it comprises for each polarity a capacitor, 31a and 31b, respectively, a charging member for the capacitor in the form of a rectifier, 33a and 33b, respectively, supplied from an alternating-voltage source, and a gate turn-off thyristor (GTO), 32a and 32b, respectively, connected in series with the respective capacitor. Each one of the two rectifiers consists of a controllable rectifier, the current and voltage of which are controlled in a known manner such that charging of the capacitor with a suitable speed and to a suitable voltage is obtained. Further, the pulse generator 3 comprises a resistor 34 with a low resistance so chosen that the discharging current of the capacitors through the thyristors is limited to a permissible value. Further, the pulse generator comprises an overvoltage protective device 35 in the form of a varistor for protection of the pulse generator and the components included therein, and of the rest of the furnace circuit and particularly the furnace transformer. Finally, the pulse generator includes a control device 36, which is supplied with the measured quantities "i" and "u" and which delivers firing and turn-off pulses to the thyristors 32.

Figure 2:
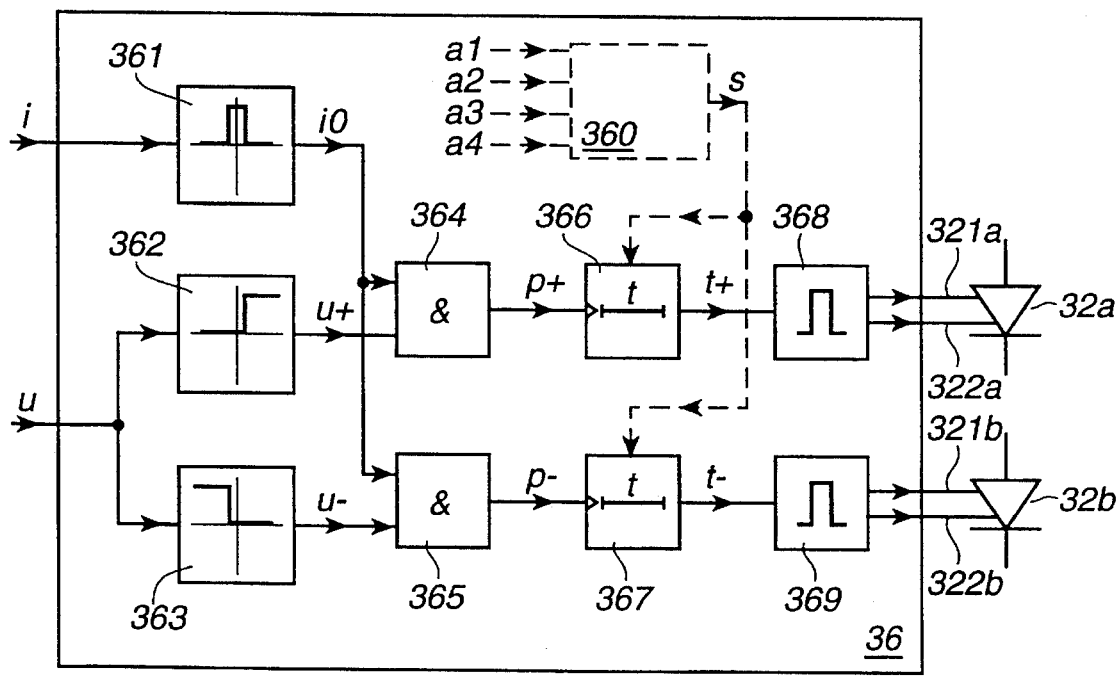
FIG. 2 shows a control device for the pulse-generating member of the equipment.

FIG. 2 shows the configuration of the control device 36. The signals "i" and "u" are supplied to level-sensing circuits 361, 362 and 363, respectively. The circuit 361 is adapted to deliver an output signal i0 which is a "1" when the furnace current is zero, that is, in practice when it is lower than a low limit value. The circuit 362 delivers a signal u+ which is "1" when the furnace voltage is positive, that is, when it exceeds a low positive value. The circuit 363 delivers a signal u– which is "1" when the furnace voltage is negative, that is, when it is lower than a low negative value. The signal i0 is supplied to one of the inputs of two AND circuits 364 and 365, and the signals u+ and u– are supplied to the other inputs of the AND circuits. The output signal p+ of the circuit 364 passes from "0" to "1" when the condition "i" zero and "u" positive is fulfilled. The signal is supplied to a differentiating input of a delay circuit 366 with the delay "t". The latter circuit thus delivers a pulse t+ at the time "t" after the above-mentioned condition has been fulfilled. This pulse is supplied to a control pulse device 368 and causes this to emit a firing signal to the firing electrode 321a of the thyristor 32a and, at a predetermined time thereafter, a turn-off signal to the turn-off electrode 322a of the same thyristor.

In similar manner, the output signal p– of the circuit 365 passes from "0" to "1" when the condition "i" zero and "u" negative is fulfilled. The signal is supplied to a differentiating input of a delay circuit 367 with the delay "t". The latter circuit thus delivers a pulse t– at the time "t" after the above-mentioned condition has been fulfilled. This pulse is supplied to a control pulse device 369 and causes this to deliver a firing signal to the firing electrode 321b of the thyristor 32b and, at a predetermined time thereafter, a turnoff signal to the turn-off electrode 322b of the same thyristor.

The time delay in the circuits 366 and 367 can suitably be of the order of magnitude of 1 ms. The time between firing and turn-off of each one of the thyristors 32a and 32b may, for example, be 100 μs.

When, for example after a half-cycle with negative voltage and current, the arc 16 is extinguished, the sensed current will be zero and the furnace voltage positive. With the delay "t", the thyristor 32a is turned on and is shortly thereafter turned off (in this example 100 μs later), the capacitor 32a thus becoming discharged through the thyristor and a short voltage pulse with a high amplitude being supplied to the electrode. The arc is thereby caused to become ignited earlier than what would otherwise be the case. In a corresponding way, the furnace is supplied with a negative voltage pulse with the aid of the thyristor 32b after a half-cycle with a positive voltage and current.

In a corresponding way, the equipment according to the invention operates if an interruption of the arc occurs at other times than at the end of the half-cycles of the furnace current. An interruption is indicated by the signal i0 becoming "1", which causes a voltage pulse to be supplied to the furnace and results in a rapid and reliable restriking of the arc. As in the case described above, the circuits 362 and 363 ensure a correct polarity to the voltage pulse.

The charging voltage of the capacitors and hence the amplitude of the applied voltage pulses may, for example, be of the order of magnitude of one or a few kV.

Each thyristor is suitably provided, in a known manner, with a so-called snubber circuit, that is, an RC circuit, connected in parallel with the thyristor, or another circuit for reducing the rate of rise of, and for limiting the maximum amplitude of, the thyristor voltage when turning off the thyristor.

The voltage pulses applied according to the invention typically give rise to a certain increase of the amplitude of the furnace current, a considerable reduction of the dead time (the time between extinction and restriking of the arc) and a more rapid growth of the current after striking of the arc. An important advantage of the invention is therefore the considerable increase which is obtained of the current-time area during each half-cycle of the furnace current, and hence the considerable increase of the production capacity of the furnace. By the chosen delay between the current zero-crossing and the voltage pulse, the advantageous effects of the invention are strengthened. Especially advantageous is the described delay when the furnace current is low and the dead time long.

Figure 3A:
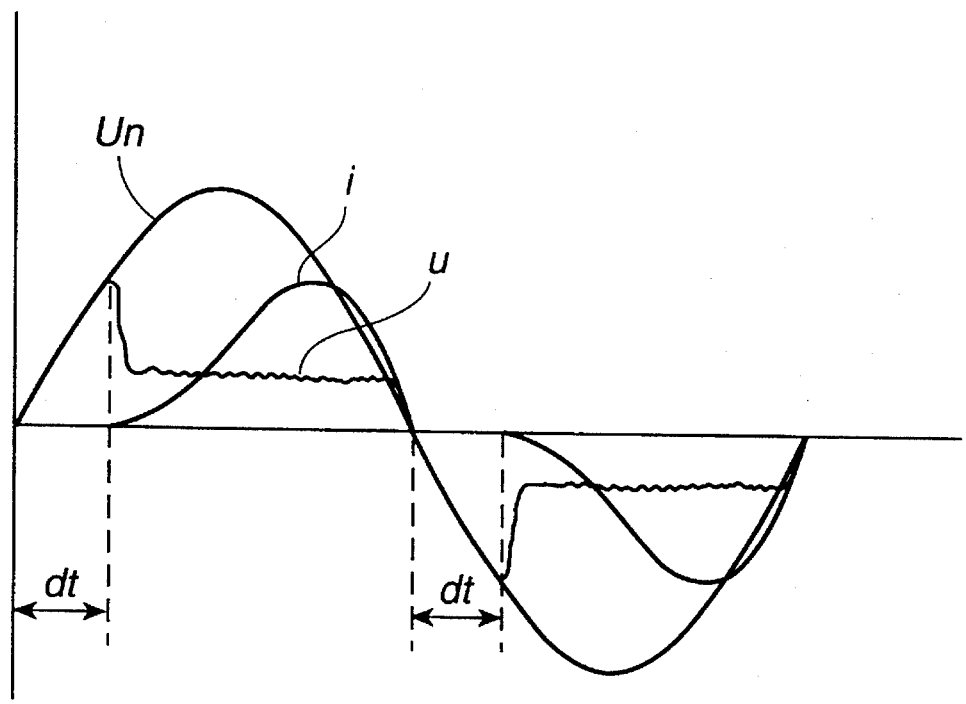
FIGS. 3a and 3b illustrate the function of the equipment.
Figure 3B:
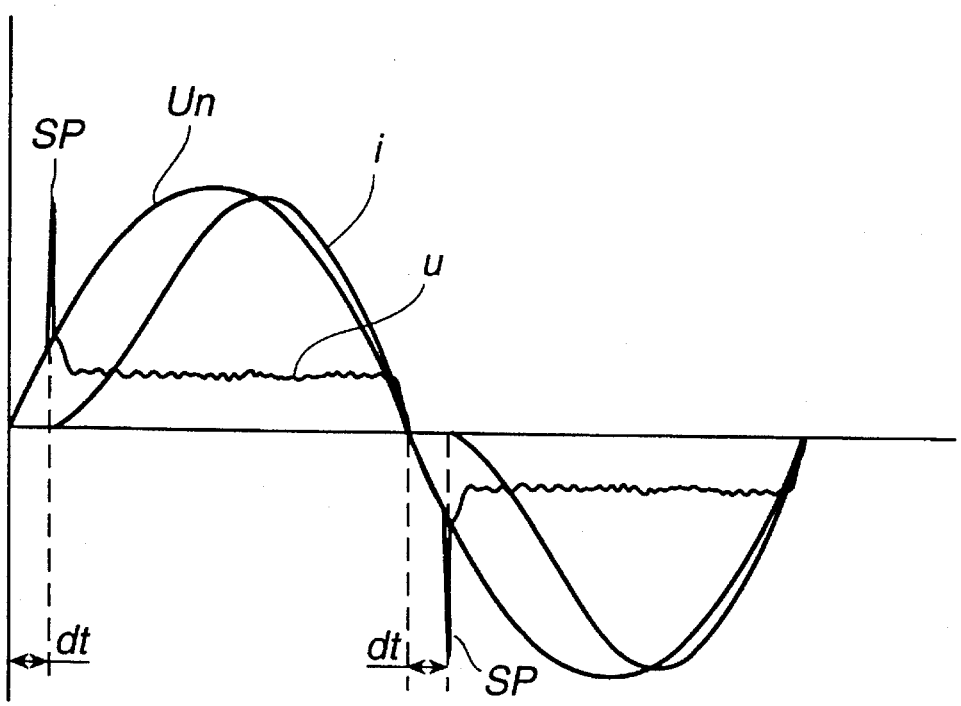

FIGS. 3a and 3b show an example of the effects of the invention. The figures show the supply voltage $u_n$ (the secondary voltage of the transformer), the furnace voltage u (approximately equal to the arc voltage) and the furnace current i. FIG. 3a shows, for one alternating-voltage cycle, the conditions during operation in the manner previously known, that is, without the voltage pulses according to the invention. FIG. 3b shows, also for one cycle, the conditions during operation according to the invention. The voltage pulses are marked "SP". As can be seen, a considerable reduction of the dead time dt is obtained with the aid of the invention, which results in a considerable increase of the power factor of the furnace equipment. Similarly, a certain increase of the current amplitude and a considerable increase of the current-time area, and hence of the productivity of the furnace, are obtained. In this operating case, the furnace is supplied with 50 Hz alternating voltage with 400 V amplitude. The inductance 22 in FIG. 1 is 10 μH. The delay "t" of the circuits 366 and 367 was 1 ms. As is clear from the figure, an increase of the amplitude of the furnace current from about 25 kA to about 40 kA and a reduction of the dead time from about 2 ms to about 1 ms were obtained. Thus, in a simple and economical way, considerable improvements of the operating properties of the furnace can be obtained. The energy in the voltage pulses will for the most part be supplied to the arc and hence to the furnace, so the power losses in the voltage-pulse generating circuit according to the invention are small.

In those cases where the furnace is operated with medium-high or high current and already has a short dead time, it may be advantageous to reduce or completely eliminate the delay described. The delay in the circuits 366 and 367 may therefore advantageously be made variable in dependence on the operating conditions of the furnace. This is shown in FIG. 2 by supplying a control signal S (dashed line) to the circuits, for controlling the magnitude of the delay "t". This control signal can be manually influenced for adjusting the delay to a value which gives optimum operating conditions. Alternatively, the delay can be controlled automatically in dependence on one or more sensed operating variables. FIG. 2 shows how a plurality of sensed operating variables a1, a2, a3, a4 are supplied to a control unit 360, which calculates and generates the control signal S which in each case gives the optimum delay as a predetermined function of the sensed operating variables. Examples of suitable operating variables for controlling the delay are, as mentioned above, the mean value and the dead time of the furnace current.

It has proved that the advantageous effect of the invention, in an often complicated and incompletely predictable way, depends on the value of the above-mentioned time delay. Alternatively, therefore, the control unit 360 can be designed as an optimization unit, in a manner known per se within control engineering. It is then supplied continuously with—or determines itself based on sensed operating variables—one or more of the quantities which are influenced by the delay and which are desired to be optimized with the aid of the invention. These quantities may, for example, be the flicker amplitude within a certain frequency range, the reactive-power consumption and the mean current of the furnace. The control unit calculates an optimization variable according to a predetermined function of these variables. The function is chosen such that the operation, if the optimization variable is maintained at a minimum (or a maximum), is considered optimal. For example, the function may be a simple linear relationship $$T = k1 \cdot a1 + k2 \cdot a2 + k3 \cdot a3 + \ldots$$

where a2, a2, etc., are the different operating variables, where k1, k2, etc., are the chosen weighing factors for the respective operating variable, and where T is the optimization variable. The control unit in a known manner automatically and continuously adjusts the control signal S and hence the set delay, and the unit senses the changes of the variable T caused by the delay. This is done in such a way that the variable T is always maintained at a minimum (or maximum) and thereby the operation of the furnace is always optimal in accordance with the criteria predetermined by the optimization function.

Figure 4:
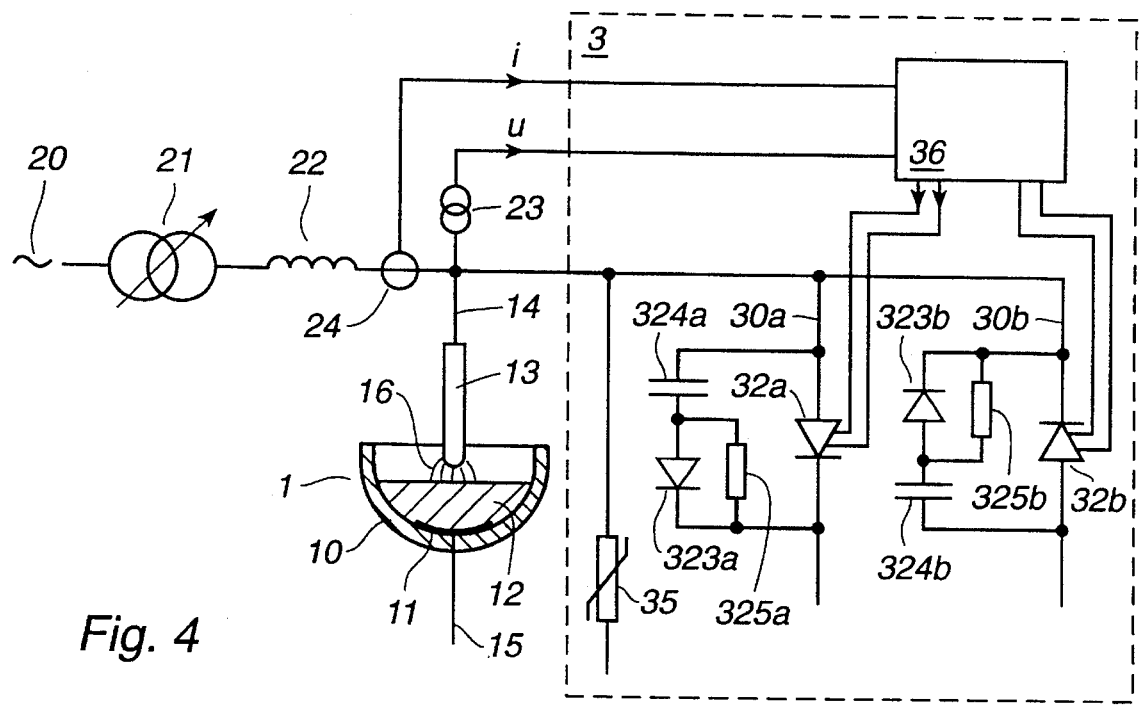
FIG. 4 shows an alternative embodiment of equipment according to the invention, wherein the voltage pulses are generated by closing and then breaking an inductive short-circuit path in parallel with the furnace.

FIG. 4 shows an alternative embodiment of furnace equipment according to the invention. It differs from that shown in FIG. 1 by the design of the voltage-pulse generating member 3. This is considerably simplified in that the capacitors and their charging devices have been eliminated. Instead, shortcircuit paths 30a, 30b are connected in parallel with the furnace and with the aid thereof the furnace can be shortcircuited. For closing and opening, respectively, of the short-circuit paths, the turn-off thyristors 32a and 32b are connected into the paths. When a voltage pulse is to be generated, for example a positive pulse, the corresponding thyristor is fired, in this case 32a. The short-circuit path 30 is then closed, and a rapidly increasing short-circuit current is driven by the supply voltage of the furnace through the inductance 22 and the short-circuit path. After a time interval, so selected that the current has time to reach a high value but not a value exceeding the current capability of the thyristor, the thyristor is turned off. The short-circuit path is then opened, and a voltage is induced in the inductance which gives a positive voltage pulse of a high amplitude across the furnace. The interval between turn-on and turn-off may as an example, under the operating conditions described with reference to FIG. 3, be about 500 μs, which means that a maximum short-circuit current of the order of magnitude of 10 kA is built up prior to the turn-off of the thyristor. To some extent depending on the dimensioning and design of the snubber circuits, this is sufficient to generate a voltage pulse of sufficient amplitude—typically a few kV—to give a rapid and reliable restriking of the arc. Each thyristor is provided with a snubber circuit consisting of a capacitor 324a, 324b in series with a resistor 325a, 325b.

The resistor is connected in parallel with a diode 323a, 323b with the same conduction direction as the thyristor, the reason being to facilitate the turn-off in a known manner by providing a slower voltage rise during the turn-off process.

The control device 36 can be designed in the same way as that shown in FIG. 2, and the function and the effect of the equipment according to FIG. 4 are, in all essentials, the same as described with reference to FIGS. 1–3.

The varistor 35 limits the pulse and thus protects the pulsegenerating equipment and its components as well as the furnace circuit and especially the furnace transformer. In the control device shown in FIG. 2, each thyristor is turned on for a predetermined period of time, in the example described 500 μs. Alternatively, the current through the turned-on short-circuiting thyristor can be measured and the thyristor be turned off when the current has reached a pre-determined value, for example a value within the interval 1 kA–10 kA, depending on, inter alia, the current capability of the short-circuiting thyristors.

The embodiments of the invention described above with reference to FIGS. 1–4 can be used, with appropriate alterations, both for single-phase and multi-phase furnaces. Furnaces of the kind described occurring in practice are normally of three-phase design. Such a furnace often has no bottom contact, and in these cases the charge of the furnace is not electrically accessible. In such furnaces the items of equipment described above are not directly applicable.

Figure 5:
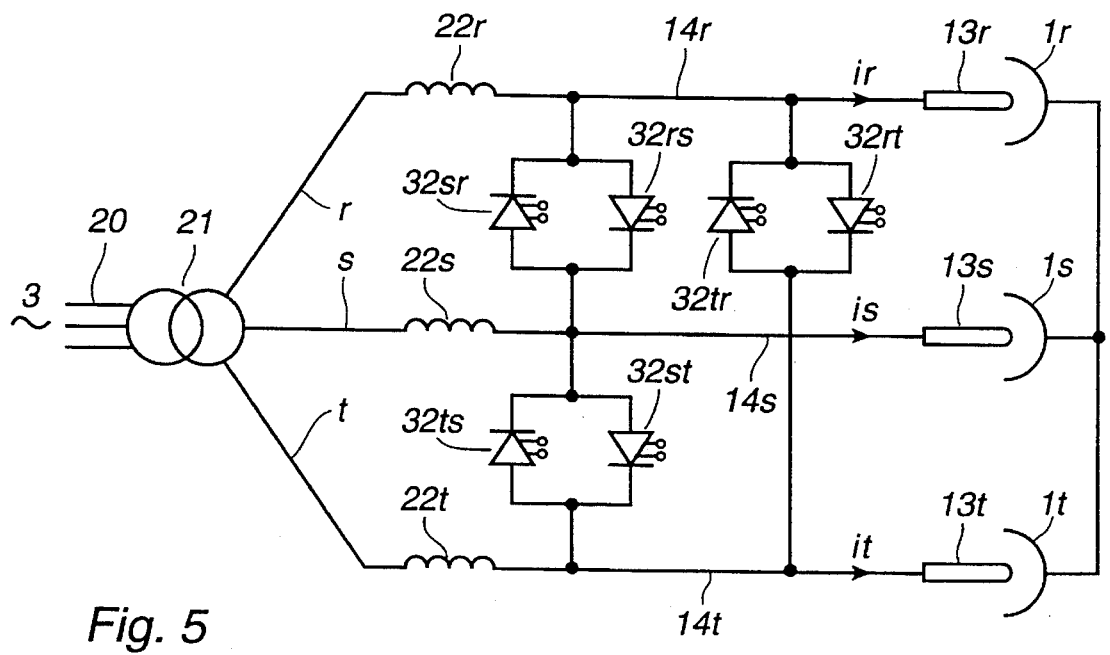
FIG. 5 shows a three-phase variant of the equipment shown in FIG. 4.

FIG. 5 shows equipment for supplying a three-phase arc furnace. The power supply network 20 is a three-phase network, and the furnace transformer 21 is a three-phase transformer. In the figure the furnace is symbolically shown as three single-phase furnaces 1r, 1s, 1t but in reality consists of one single furnace container with a charge, above which the three electrodes 13r, 13s 13t are arranged. The equipment generates voltage pulses according to the principle described above with reference to FIG. 4. However, in this case the short-circuit paths are established between the three connection leads 14r, 14s, 14t of the furnace. This is done with the aid of the thyristor connections 32sr–32rs, 32ts–32st, 32tr–32rt connected between the connection leads. Each such connection consists of two antiparallel-connected turn-off thyristors. The thyristors are provided with snubber circuits, which for the sake of simplicity are not shown in the figure, for example of the same type as the snubber circuits shown in FIG. 4.

Figure 6:
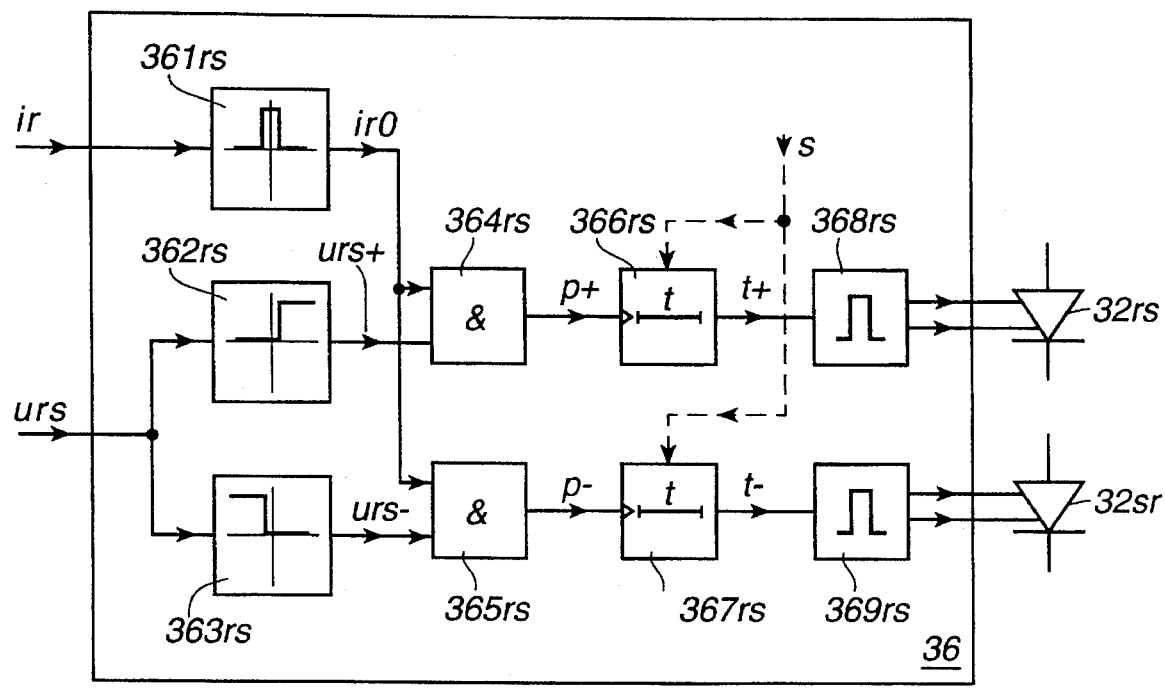
FIG. 6 shows an example of a control device for this variant.

The control equipment for the thyristors can be designed in a manner analogous to the equipment shown in FIG. 2. An example of that part of the equipment which controls the thyristors 32rs and 32sr is shown in FIG. 6. The current ir in phase r is sensed, and a signal ir0 ="1" is delivered by a level detector 361rs if the absolute value of the current is below a predetermined low level. The signal is supplied to the AND circuits 364rs and 365rs. The voltage urs between the phases r and s is sensed and supplied to level detectors 362rs and 363rs. The former detector delivers a signal urs+="1" if the voltage is positive, and the latter detector delivers a signal urs−="1" if the voltage is negative. These signals are supplied to the AND circuits 364rs and 365rs. In a manner analogous to that shown with reference to FIG. 2, the circuit 364rs, when both its input signals are "1", delivers a signal p+ for firing the thyristor 32rs. The circuit 365rs delivers a signal p− for firing the thyristor 32sr when both its input signals are "1". The signals p+ and p− are supplied to the delay circuits 366rs, 367rs with differentiating inputs and with controllable delay. The output signals t+ and t− from these circuits are supplied to the control devices 368rs, 369rs, which deliver turn-on and turn-off signals to the thyristors 32rs and 32sr, respectively.

The control circuit shown in FIG. 6 and described above operates in a way which is completely analogous to that described above with reference to FIGS. 1–4. When the current in one phase (r) becomes zero, one of the two thyristors (32rs, 32sr), which are connected to the phase (s) which is positioned immediately after in the phase sequence (rst) of the supply alternating voltage, is fired, with a possible delay. Only one of these thyristors can carry current, depending on which of the phases mentioned has the highest potential. The level detectors (362rs, 363rs) ensure that this very thyristor is fired (and turned off after having worked up a short-circuit current of a suitable magnitude). During the next half-cycle, the other of the two mentioned thyristors is fired.

The configuration and the mode of operation of the control circuits for the other two thyristor pairs are completely analogous to that described above.

Figure 7:
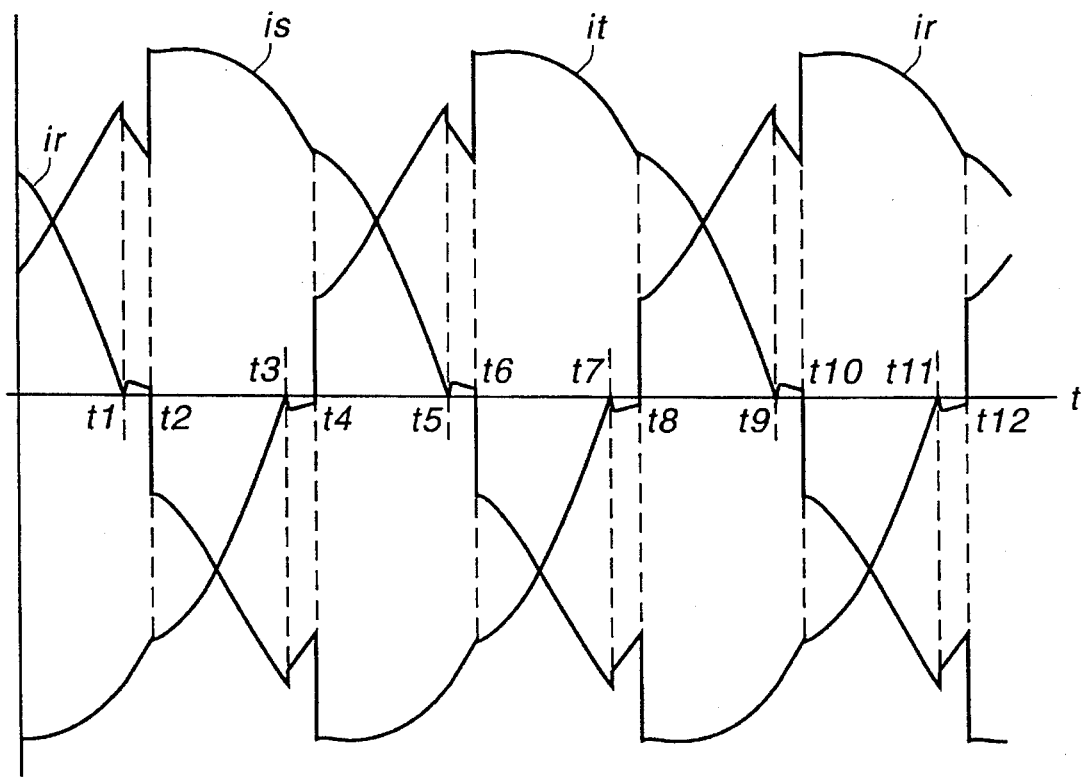
FIG. 7 illustrates the function of this equipment.

FIG. 7 shows the mode of operation of the equipment shown in FIGS. 5 and 6. In FIG. 7, the three phase currents ir, is, it of the furnace are shown as a function of time t. Furthest to the left in the diagram, ir is positive and declining. When ir becomes zero, the thyristor 32sr is fired at t=t1, and the supply voltage drives a short-circuit current through this thyristor and the inductances 22r, 22s (the voltage in phase s is positive in relation to the voltage in phase r). Part of the furnace current in phase s passes during this interval through the thyristor 32sr. At t=t2, this current has reached a sufficiently high value, and the thyristor 32sr is turned off. This causes a negative voltage pulse to be induced into the phase r of the furnace, which immediately fires the arc in this phase, and a high current immediately starts to flow. During the process described, the current in phase t is influenced only to an insignificant extent.

At t=t3, the thyristor 32tr is fired, and at the turn-off thereof, at t=t4, a positive voltage pulse is supplied to the phase t of the furnace, whereby the arc in this phase is fired.

At t=t5, the thyristor 32ts is fired, and at the turn-off thereof, at t=t6, a negative voltage pulse is supplied to the phase s of the furnace, whereby the arc in this phase is fired.

At t=t7, the thyristor 32rs is fired, and at the turn-off thereof, at t=t8, a positive voltage pulse is supplied to the phase r of the furnace, whereby the arc in this phase is fired.

At t=t9, the thyristor 32rt is fired, and at the turn-off thereof, at t=t10, a negative voltage pulse is supplied to the phase r of the furnace, whereby the arc in this phase is fired.

At t=t11, the thyristor 32st is fired, and at the turn-off thereof, at t=t12, a positive voltage pulse is supplied to the phase t of the furnace, whereby the arc in this phase is fired.

In FIG. 7 it has been assumed, for the sake of simplicity, that the short-circuit thyristor is fired simultaneously with the furnace current becoming zero, that is, the time delay of the delay circuits 366rs and 367rs are assumed to be zero. The function is analogous to that shown if the delay in these circuits is greater than zero.

The embodiments of the invention described above relate to a.c. furnaces. However, the invention offers considerable advantages also in connection with d.c. furnaces, because also in such furnaces interruptions in the arc occur, especially when melting down a charge. Since the invention provides a rapid and efficient restriking of the arc, a smoother operation is obtained also in this case, that is, a reduction of the effect of the furnace on the network, as well as an increase of the mean current of the furnace and therefore an increase of the production capacity of the furnace.

The embodiments of the invention described above show the case where one single voltage pulse is supplied to the furnace in connection with the zero crossing of the furnace current, that is, in case of an interruption in the arc. Firing of the arc according to the invention can alternatively take place by supplying to the furnace, instead of one single pulse, two or more pulses, for example in the form of a high-frequency pulse train. Similarly, in the embodiments of the invention described above, only one single voltage pulse is supplied to the furnace in connection with each zero crossing of the furnace current (each interruption of the arc). Although this is a preferred embodiment, it is possible within the scope of the invention to modify the control circuits such that, for example in dependence on some predetermined criterion, voltage pulses for striking the arc are supplied only in case of certain kinds of interruptions in the arc.

We claim:

1. Furnace equipment, comprising: an arc furnace with at least one electrode and connection members for connecting the furnace to a power-supply network for supplying an arc at the electrode with current, at least one pulse-generating member which supplies to the furnace, in connection with an interruption in the arc, at least one voltage pulse for striking the arc.

2. Furnace equipment according to claim 1, wherein said at least one pulse-generating member comprises a controllable short-circuit path, connected to the connection members of the furnace, as well as members which close the short-circuit path and thereafter open the short-circuit path for generating a voltage pulse.

3. Furnace equipment according to claim 2, wherein inductive members are arranged between at least one of the connection members and the power-supply network.

4. Furnace equipment according to claim 2, wherein the short-circuit path comprises a thyristor connection capable of being turned off by a control signal, the short-circuit path being closed by firing a thyristor included in the thyristor connection, and being opened by turning off the thyristor.

5. Furnace equipment according to claim 2, comprising a multi-phase arc furnace with at least a first and a second electrode, a first phase lead for connecting said at least first electrode to a first phase of an alternating-voltage power-supply network and a second phase lead for connecting said at least second electrode to a second phase of said alternating-voltage power-supply network, and comprising at least one short-circuit path between said first and said second phase lead.

6. Furnace equipment according to claim 5, wherein said alternating-voltage power-supply network has a phase-sequence such that said second phase is positioned immediately after said first phase in the phase sequence, and comprising a short-circuit path for said first electrode between said first phase lead and said second phase lead, members to close and thereafter to open the short-circuit path in case of an interruption in the arc at said first electrode.

7. Furnace equipment according to claim 1, wherein said at least one pulse-generating member comprises a precharged capacitor and switching members for connecting the capacitor to the furnace.

8. Furnace equipment according to claim 1, further comprising current-detecting members which detect interruptions in the arc of an electrode by detecting interruptions in the electrode current, and influence said at least one pulse-generating member for generating a voltage pulse for striking the arc at the electrode.

9. Furnace equipment according to claim 1, wherein said at least one pulse-generating member generates the voltage pulse to an electrode with a delay after an interruption in the arc at said electrode.

10. Furnace equipment according to claim 9, wherein said at least one pulsegenerating member comprises a control member for controlling the delay.

11. Furnace equipment according to claim 10, wherein said at least one pulse-generating member comprises a member which senses an operating variable (a1, a2, a3, a4) in the furnace and controls the delay in dependence on the operating variable.

12. Furnace equipment according to claim 10, wherein said at least one pulse-generating member comprises a member which forms an optimization variable (T) and controls the delay in dependence on this variable.

* * * * *